(12) United States Patent
Anderson et al.

(10) Patent No.: US 6,751,056 B1
(45) Date of Patent: Jun. 15, 2004

(54) TAPE DRIVE HEAD CLEANER

(75) Inventors: James C. Anderson, Eagle, ID (US); Darrel R. Bloomquist, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 977 days.

(21) Appl. No.: 09/187,138

(22) Filed: Nov. 6, 1998

Related U.S. Application Data

(63) Continuation-in-part of application No. 09/042,323, filed on Mar. 13, 1998, now Pat. No. 5,930,089.

(51) Int. Cl.$^7$ .................................................. G11B 5/41
(52) U.S. Cl. ........................................................ 360/128
(58) Field of Search ................................ 360/128, 134, 360/132; 15/DIG. 12, DIG. 13

(56) References Cited

U.S. PATENT DOCUMENTS

| | | | |
|---|---|---|---|
| 4,556,890 A | | 12/1985 | Hermanson et al. ....... 346/74.4 |
| 4,704,647 A | * | 11/1987 | Hino .......................... 360/128 |
| 4,920,439 A | * | 4/1990 | Bordignon ............. 360/130.21 |
| 5,383,076 A | * | 1/1995 | Saito et al. ................. 360/128 |
| 5,453,894 A | * | 9/1995 | Kim et al. .................. 360/128 |
| 5,469,318 A | * | 11/1995 | Inoue et al. ................ 360/128 |
| 5,710,684 A | | 1/1998 | Inoue et al. ................ 360/128 |
| 5,930,089 A | * | 7/1999 | Anderson ................... 360/128 |
| 6,028,751 A | * | 2/2000 | Fritsch et al. .............. 360/128 |

FOREIGN PATENT DOCUMENTS

| | | | |
|---|---|---|---|
| EP | 0530837 A1 | | 10/1993 |
| EP | 0800162 A2 | | 10/1997 |
| JP | S64-43810 | | 2/1989 |
| JP | 05067317 | * | 3/1993 |
| JP | H8-203040 | | 8/1996 |

* cited by examiner

*Primary Examiner*—A. J. Heinz
*Assistant Examiner*—Angel Castro

(57) ABSTRACT

A head cleaning device that utilizes a cleaning pad in which a multiplicity of fibers are integrated into and project from a backing by, for example, sewing or weaving the fibers into the backing. Preferably, the fibers and backing are made from an electrically conductive or statically dissipative material to minimize electro-static charge build up. The cleaning device may be incorporated into a tape drive that includes a transducer head, tape guides configured to guide the tape over the head and a cleaning mechanism. The cleaning mechanism, which is configured to engage the head, includes the cleaning pad mounted to a carrier disposed near the head. The cleaning pad is constructed of a multiplicity of fibers integrated into and projecting from the backing.

17 Claims, 5 Drawing Sheets

TAPE DRIVE HEAD CLEANER

CROSS REFERENCE TO RELATED APPLICATIONS

This application is a continuation-in-part of U.S. patent application Ser. No. 09/042,323, filed Mar. 13, 1998 now U.S. Pat. No. 5,930,089 entitled "Head Cleaner for Linear Tape Drive", herein incorporated by reference.

FIELD OF THE INVENTION

The invention relates generally to tape drives and, more particularly, to a tape drive head cleaner that uses a cleaning pad mounted in the tape drive.

BACKGROUND OF THE INVENTION

Information is recorded on and read from a moving magnetic tape with a magnetic read/write head positioned next to the tape. The magnetic "head" may be a single head or, as is common, a series of read/write head elements arranged individually and/or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

The performance of the head may be adversely effected by debris that often accumulates on the head. Consequently, the head should be cleaned periodically to remove debris. Several different techniques and devices have been used to clean the head. Cleaning tape cartridges use abrasive tape to clean the head. U.S. Pat. No. 5,671,108 describes an open cell foam cleaning pad used in a cleaning cartridge instead of a cleaning tape.

The head cleaning device is built into some tape drives. The IBM Magstar 3590™ tape drive, for example, includes a cleaning brush that contacts the head during the tape threading operation. As the leader block on the tape is pulled into the tape cartridge, the leader block hits a lever that brings the cleaning brush into contact with the head. An actuator moves the head up and down to provide a scrubbing action between the head and the brush.

A prior art brush, such as the brush used in the IBM Magstar 3590, is shown in the front and side elevation views of FIGS. 1 and 2. These brushes 2 are quite narrow since the bristles 4 are crimped into a holder 6. If a wider brush is desired, multiple brushes are placed side by side. This configuration adds to the cost and complexity of the cleaning device. Also, since the holder must grasp the bristles, it is not possible to make a brush that is very short, about 2–3 mm, along the length of the bristles. Hence, some tape drive designs may not have enough room to accommodate this type of cleaning brush. Further, it is difficult to hold the bristles securely in place using crimped holder brushes. Any stray bristles that are dislodged from the holder during brushing operations could seriously effect the performance of the tape drive, or even cause the drive to fail.

SUMMARY OF THE INVENTION

Accordingly, the present invention is directed to a head cleaning device that utilizes a cleaning pad to help overcome some of the disadvantages of conventional head cleaners. The head cleaner of the present invention includes a cleaning pad in which a multiplicity of fibers are integrated into and project from a backing by, for example, sewing or weaving the fibers into the backing. Preferably, the fibers and backing are made from an electrically conductive or semi-conductive material to minimize electro-static charge build up. In one exemplary embodiment of the invention, the cleaning device is incorporated into a tape drive that includes a transducer head, tape guides configured to guide the tape over the head, and a cleaning mechanism. The cleaning mechanism, which is configured to engage the head, includes the cleaning pad mounted to a carrier disposed near the head. As summarized above, the cleaning pad is constructed of a multiplicity of fibers integrated into and projecting from the backing.

DETAILED DESCRIPTION OF THE INVENTION

Figures 1, 2:
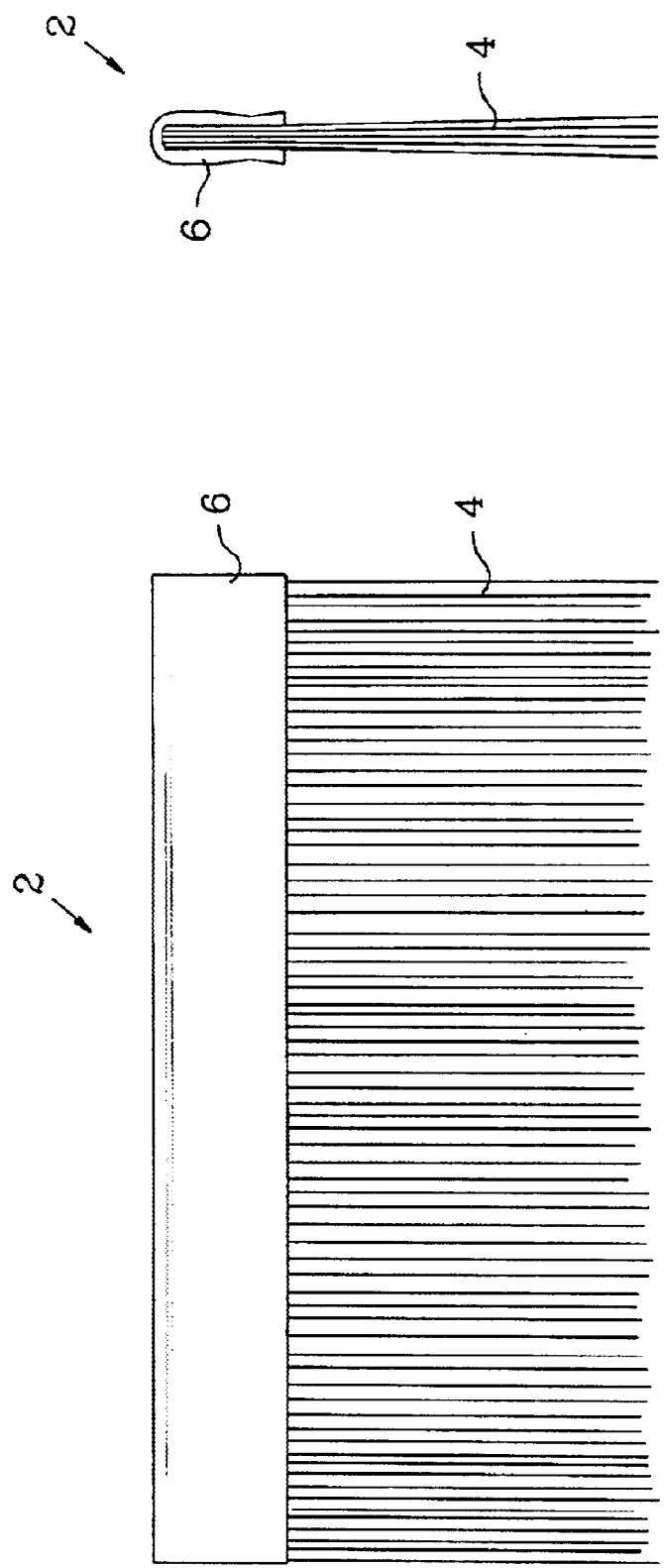
FIG. 1 is a front elevation view of a prior art cleaning brush.
FIG. 2 is a side elevation view of the prior art cleaning brush of FIG. 1.
Figure 3:
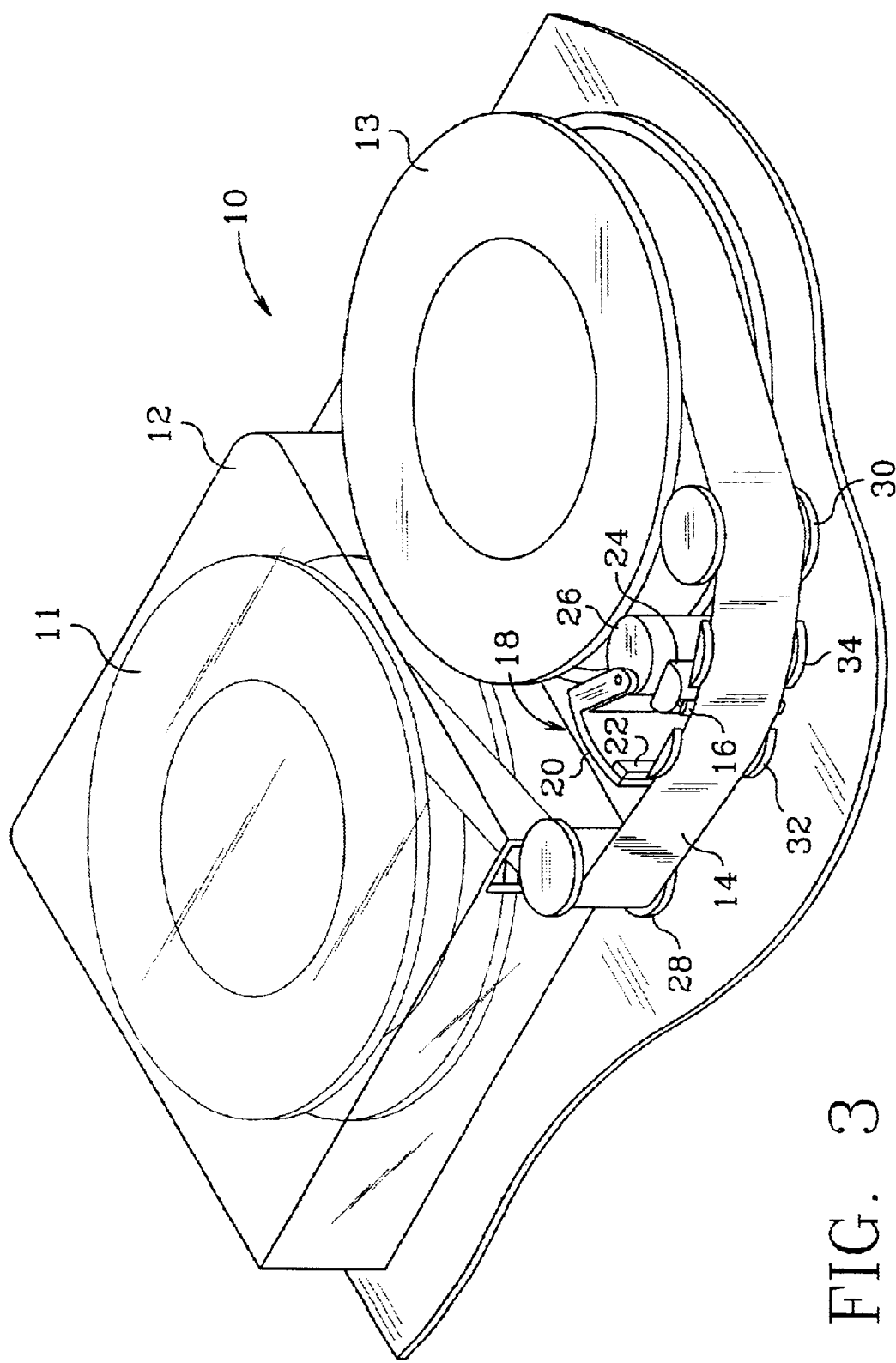
FIG. 3 is a simplified partial perspective view of the inside of a tape drive showing one type of cleaning mechanism that incorporates the cleaning pad of the present invention.
Figure 4:
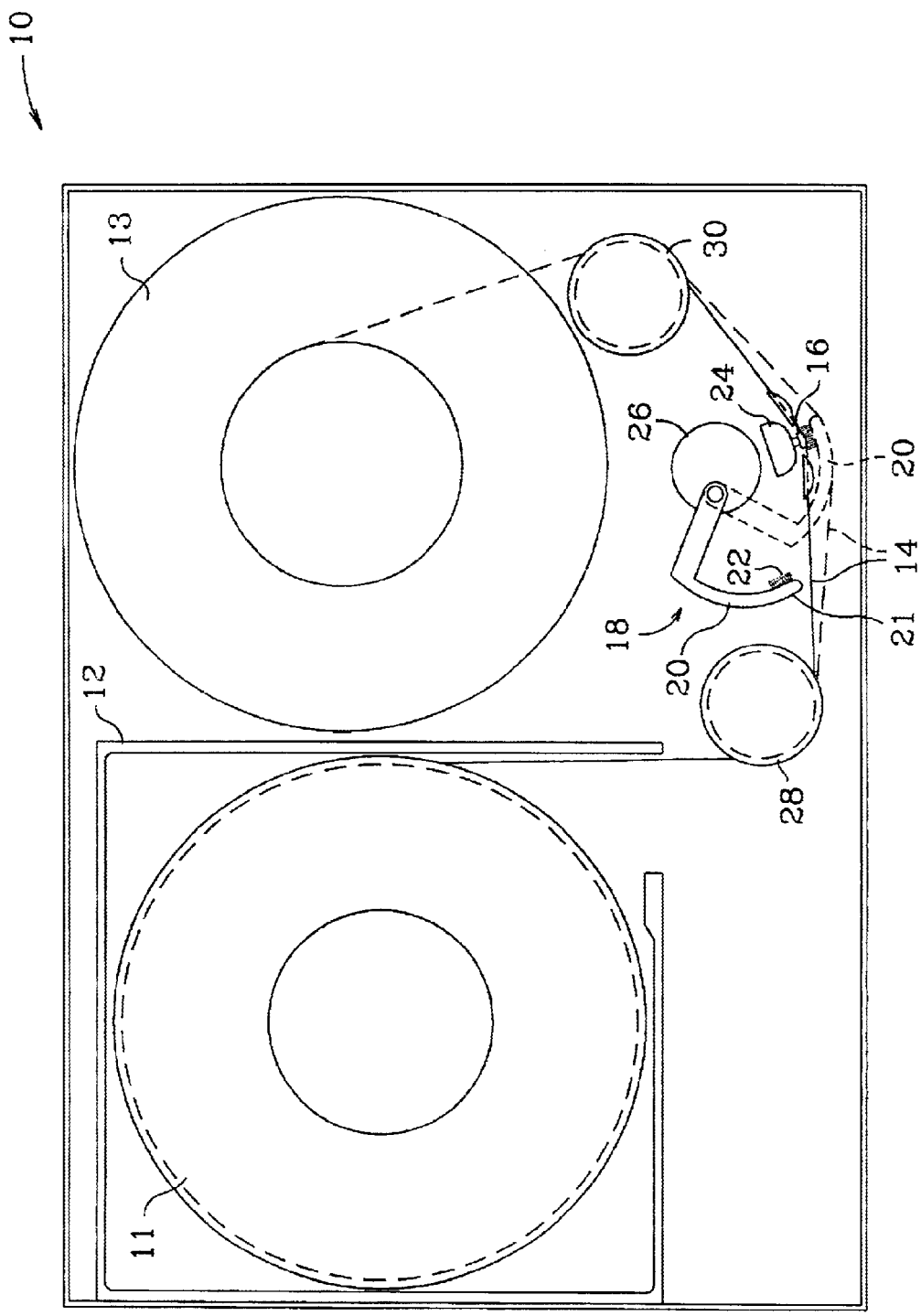
FIG. 4 is a plan view of the tape drive of FIG. 3.

FIGS. 3 and 4 illustrate the internal operating configuration of a tape drive 10 with a tape cartridge 12 loaded in tape drive 10. Tape 14 moves over a magnetic tape head 16. Head 16 typically contains a number of read/write head elements that read data from or write data to tape 14. Actuator 24 moves head 16 up and down to properly position the read/write elements relative to tape 14. A head cleaning mechanism, designated generally by reference number 18, includes an arm 20 and cleaning pad 22. Cleaning pad 22 is secured to the end 21 of arm 20. Arm 20, which serves as a carrier for pad 22, is mounted to a second actuator 26.

Tape 14 moves between a supply spool 11 in cartridge 12 and a take-up spool 13 in tape drive 10. Tape 14 travels around guide rollers 28 and 30 and optional stationary guides 32 and 34. During cleaning operations, arm 20 pivots out at the urging of arm actuator 26 so that cleaning pad 22 contacts head 16 as shown by the dotted lines in FIG. 4. Arm 20 and arm actuator 26 illustrate one mechanism for moving cleaning pad 22 into contact with head 16. Other mechanisms may be used. The particular mechanism used to move cleaning pad 22 into contact with head 16 is not important to the present invention except to the extent the mechanism carries cleaning pad 22 into contact with head 16. The details of the structure and operation of tape drive 10 are described in more detail in application Ser. No. 09/042,323, entitled Head Cleaner For Linear Tape Drive and filed Mar. 13, 1998, incorporated herein by reference.

Figure 5:
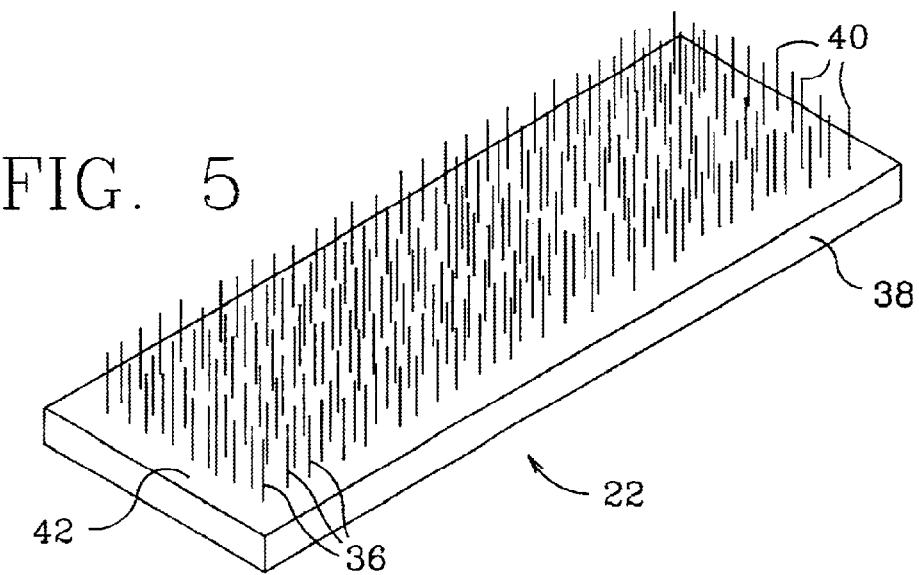
FIG. 5 is a detail perspective view of one embodiment of the cleaning pad shown in the tape drive of FIG. 3.
Figure 6:
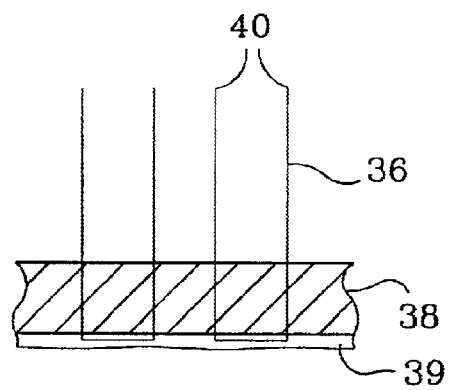
FIG. 6 is a partial cross section view of the cleaning pad of FIG. 4 showing one configuration for integrating the bristle fibers into the backing material.

Referring now to FIGS. 5 and 6, cleaning pad 22 includes cleaning fibers 36 integrated into a backing 38. Depending on the particular tape drive and/or the structure and configuration of the read/write head elements, however, cleaning fibers 36 may vary between a dense array of thin flexible filaments to a more open array of coarse stiff bristles. Preferably, arm actuator 26 is configured to move cleaning pad 22 and, correspondingly, fibers 36 back and forth across head 16. Similarly, head actuator 24, which is typically configured to move head 16 up and down, will add a vertical cleaning motion by moving head 16 up and down across cleaning pad 22. Fibers 36 should be formed or trimmed to the desired length leaving the ends 40 of the fibers 36 exposed for contacting head 16 during cleaning. It is desirable to leave the fiber ends exposed to reach into the small contours of a variety of different heads and head elements. If the fiber ends are looped to return to the backing, the fibers will not be as effective to reach into the small contours of the head.

Fibers 36 may be integrated into backing 38 using any suitable method. For example, fibers 36 may be sewn or woven into backing 38 and, preferably, further secured to the backing with an adhesive 39 (shown in FIG. 6). It is desirable to make fibers 36 from an electrically conductive or statically dissipative material to minimize the build up of static charge during cleaning operations when fibers 36 are brushing against head 16. Suitable materials include, for example, coated synthetic fibers, carbon and stainless steel. Backing 38 and/or adhesive 39 should also be made from a statically dissipative or conductive material so that the entire cleaning pad 22 may be easily grounded to further reduce static charge build up.

The cleaning pad of the present invention allows the length of cleaning pad 22 in the fiber direction to be shorter than conventional crimped cleaning brushes. This feature allows the use of cleaning pad 22 in tape drives that otherwise would not accommodate a cleaning mechanism.

Cleaning pad 22 may be manufactured to any desired size and shape. Hence, there is no need to secure multiple pads together to construct "wide" cleaners as with conventional brush designs.

Figure 7:
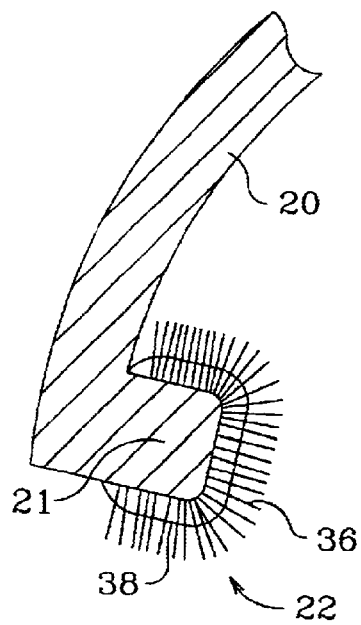
FIG. 7 is a cross section view of the cleaning pad attached to the end of the arm of the cleaning mechanism of FIG. 3 in which the pad extends around the sides of the arm to move any loose fibers at the edges of the cleaning pad away from contact with the head.
Figure 8:
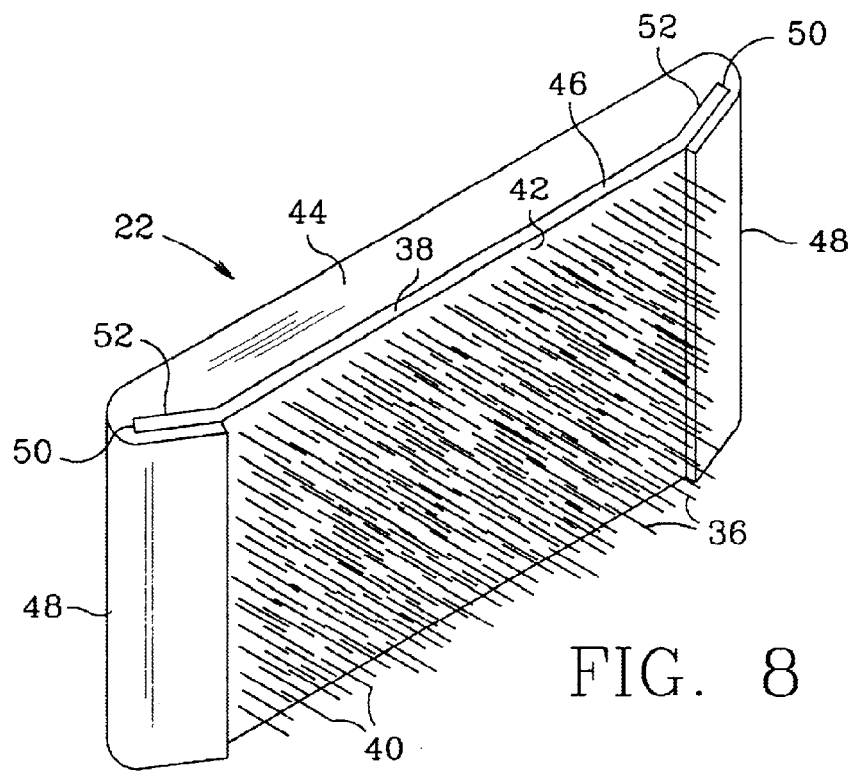
FIG. 8 is a perspective view of the cleaning pad mounted to a form having ends crimped over the cut ends of the pad to contain any loose fibers.
Figure 9:
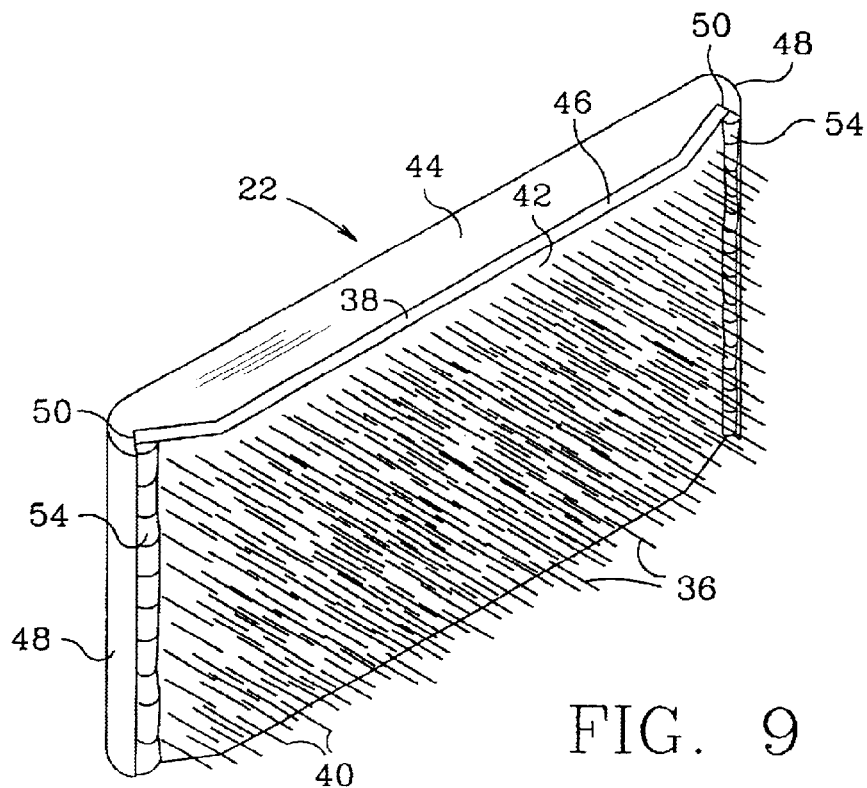
FIG. 9 is a perspective view of the cleaning pad mounted to a form having a bead of adhesive placed along the cut ends of the pad to contain any loose fibers.

A variety of techniques could be used to manufacture cleaning pad 22. For example, a large piece of backing in which the cleaning fibers have been woven could be stamped into the desired pattern(s) for cleaning pads 22. To eliminate loose fibers at the edges of the cuts, which might be dislodged during cleaning operations, the fibers could be woven into the backing in the desired pattern leaving a cutting space between adjacent cleaning pad patterns. Individual cleaning pads 22, shown in FIG. 5, can then be cut through the cutting spaces to produce a border area 42 around each cleaning pad 22 so that there are no loose fibers at the cut edges. Alternative techniques to minimize the risk of dislodging loose edge fibers are illustrated in FIGS. 7–9. In FIG. 7, cleaning pad 22 is wrapped around the end 21 of arm 20. Wrapping cleaning pad 22 in this fashion moves the cut ends/edges away from the area of the pad that contacts head 16. In the embodiments of FIGS. 8 and 9, cleaning pad 22 is mounted to a form 44. Fibers 36 of cleaning pad 22 are woven to the desired width so that there are no loose fibers along the lengthwise edge 46. In FIG. 8, the ends 48 of form 44 are crimped (for a metal form 44) over cut ends 50 to contain loose fibers. If form 44 is molded from plastic, pockets 52 are formed to contain any loose fibers at the cut ends 50. Pad 22 may be secured to plastic form 44 by, for example, gluing the pad to the form and/or heat crimping pockets 52 on to the pad. In FIG. 9, a bead of adhesive material 54 is placed along cut ends 50 to contain loose fibers. Form 44 may be curved if necessary or desirable to keep the crimped ends 48 or bead of adhesive material 54 from contacting the head of the tape drive during cleaning operations. Form 44 may be constructed as a discrete component secured to arm/carrier 20. Alternatively, form 44 maybe formed integral to arm 20.

While the present invention has been shown and described with reference to the foregoing exemplary embodiments, it is to be understood that other forms and details may be made thereto without departing from the spirit and scope of the invention. The cleaning pad of the present invention, for example, is not limited to use with a magnetic head in the linear tape drive described and shown above. The cleaning pad might also be used in connection with any of a variety of storage devices that use magnetic or other types of transducer heads, including both linear and helical scan tape drives. The invention, therefore, is to be construed broadly within the scope of the following claims.

What is claimed is:

1. A head cleaning device for a tape drive, comprising a cleaning pad mounted to a carrier disposed adjacent to a transducer head, the cleaning pad having a multiplicity of cleaning fibers woven into and projecting from a backing.

2. The head cleaning device according to claim 1, further comprising an adhesive securing the cleaning fibers to the backing.

3. The head cleaning device according to claim 2, wherein the adhesive is made from a conductive or statically dissipative material.

4. The head cleaning device according to claim 1, wherein the cleaning fibers and the backing are made from electrically conductive or statically dissipative material.

5. The head cleaning device according to claim 1, further comprising a border area on the backing, the border area being free of fibers.

6. A head cleaning device for a tape drive, comprising a cleaning pad mounted to a carrier disposed adjacent to a transducer head, the cleaning pad having a multiplicity of cleaning fibers sewn into and projecting from a backing.

7. A head cleaning device for a tape drive, comprising:
   a cleaning pad having a multiplicity of cleaning fibers integrated into and projecting from a backing;
   a form, the cleaning pad mounted to the form and the form configured to contain loose fibers on the cleaning pad; and
   a carrier disposed adjacent to a transducer head, the form secured to the carrier.

8. The head cleaning device according to claim 7, wherein a portion of the form is crimped over the pad to contain loose fibers on the pad.

9. The head cleaning device according to claim 7, wherein the form includes a pocket over ends of the pad to contain loose fibers on the pad.

10. The head cleaning device according to claim 7, further comprising adhesive disposed along ends of the pad to contain loose fibers on the pad.

11. The head cleaning device according to claim 7, wherein the form is integral to the carrier.

12. A tape drive, comprising:
   a transducer head;

a first actuator operatively coupled to the transducer head, the first actuator configured to move the transducer head in a direction generally perpendicular to the direction of motion of a tape over the transducer head; and a cleaning mechanism configured to engage the transducer head, the cleaning mechanism comprising a cleaning pad mounted to a carrier, the cleaning pad having a multiplicity of cleaning fibers woven into and projecting from a backing.

13. The tape drive according to claim 12, wherein the transducer head comprises a magnetic read/write head.

14. The tape drive according to claim 12, further comprising a second actuator operatively coupled to the carrier, the second actuator configured to move the cleaning pad in a direction generally parallel to the direction of motion of the tape over the head.

15. The tape drive according to claim 12, wherein the carrier comprises an arm having an end at one extremity, the end characterized by a face facing the transducer head when the arm is in a cleaning position and sides extending from the face, the cleaning pad wrapped around the end of the arm so that side edges of the cleaning pad are disposed along the sides of the end of the arm.

16. The tape drive according to claim 12, wherein the fibers and the backing are made from electrically conductive or statically dissipative material.

17. A tape drive, comprising:

transducer head;

a first actuator operatively coupled to the transducer head, the actuator configured to move the transducer head in a direction generally perpendicular to the direction of motion of the tape over the transducer head; and a cleaning mechanism configured to engage the transducer head, the cleaning mechanism comprising a cleaning pad mounted to a carrier, the cleaning pad having a multiplicity of cleaning fibers sewn into and projecting from a backing.

* * * * *